US006325721B1

(12) United States Patent
Miyamoto et al.

(10) Patent No.: US 6,325,721 B1
(45) Date of Patent: Dec. 4, 2001

(54) METHOD FOR FORECASTING RANKING OF RACING CONTESTS

(75) Inventors: Taichi Miyamoto, Tokyo; Kazuo Ootake, Saitama-ken; Muneomi Katayama, Tokyo, all of (JP)

(73) Assignees: Teletech Company, Ltd.; K.K. Asobou's, both of Tokyo (JP)

( * ) Notice: Subject to any disclaimer, the term of this patent is extended or adjusted under 35 U.S.C. 154(b) by 0 days.

(21) Appl. No.: 09/592,659

(22) Filed: Jun. 13, 2000

(51) Int. Cl.[7] .............................. A63F 13/00; A63F 13/10
(52) U.S. Cl. .................................. 463/40; 463/42; 700/93
(58) Field of Search ..................... 463/40–42; 700/90–93

(56) References Cited

U.S. PATENT DOCUMENTS 6,080,063 * 6/2000 Khosla .................................... 463/42
6,089,981 * 7/2000 Brenner et al. ......................... 463/40
6,099,409 * 8/2000 Brenner et al. ......................... 463/40

OTHER PUBLICATIONS

"Horse Racing Fantasy", Released May, 5, 2000, www.operationsports.com/ReviewVault/review.asp?game=horse-fantasy.*

* cited by examiner

*Primary Examiner*—Jessica J. Harrison
*Assistant Examiner*—Alex F. R. P. Rada, II
(74) *Attorney, Agent, or Firm*—Reed Smith Hazel & Thomas LLP

(57) ABSTRACT

A method provides on-site or remote viewers with real-time computer generated graphics simulating the racing venue and contestants by incorporating past and current data to forecast the ranking of racing contests. The method comprises the steps of drawing existing contestants by means of computer graphics and arranging the contestants along the start line of the existing racing venue; inputting said existing past data and existing current data just before starting of a race into all of the contestants; allowing the contestants to race on a display based on the respective data; and forecasting in advance actual race ranking from the states of said contestants and race results.

12 Claims, 12 Drawing Sheets

Fig. 7

Matsudo Bicycle Race A list of main members (Grade A)

| | | ○ | △ | ◎ | | | | | | Prediction |
|---|---|---|---|---|---|---|---|---|---|---|
| ... | | | | | | | | | Hidekatu Hosokawa | Name |
| ... | | | | | | | | | 35 | Age |
| ... | | | | | | | | | Shizuoka | Address |
| ... | | | | | | | | | 56 | Term |
| ... | | | | | | | | | 1 | Group |
| ... | | | | | | | | | Keio<br>①<br>⑥<br>④ | Latest race result |
| ... | | | | | | | | | 3<br>0<br>0<br>5 | $1^{st}$ place<br>$2^{nd}$ place<br>$3^{rd}$ place<br>Percentage |
| ... | | | | | | | | | 9<br>5.94 | Earnings |

Fig. 9

Heiwajima No.12 Qualification 1800m

| Item | | | | | | |
|---|---|---|---|---|---|---|
| Prediction | ○ | × | | ◎ | | △ |
| Number | ① | ② | ③ | ④ | ⑤ | ⑥ |
| Name | Kazuo Hiraishi | | | | | |
| Age | 33 | | | | | |
| Address | Saitama | | | | | |
| Weight | 51 | | | | | |
| Motor Number<br>Start<br>Top speed<br>Turn | 57<br>○<br>◎<br>◎ | | | | | |
| Evaluation<br>Winning percentage<br>Approach | ○<br>55<br>Center | | | | | |
| Exhibited time | 6:59 | | | | | |
| Recent results | ①<br>②<br>① | | | | | |

④=①

④-②

④-⑥

Assumed order ◇ ① ④ ② ③ ⑤ ⑥

Fig. 11

| ◆Olympic marathon members◆ | | | | |
|---|---|---|---|---|
| | ★ ★ | ★ ★ | ★ ★ | ★ ★ |
| Name | Tadayuki Sato | | | |
| Affiliation | Asahikasei | | | |
| Height/weight/Age | 175 · 57 · 27 | | | |
| Selection race | 99.8.29<br>World cup | | | |
| Record time<br>Place | 2:14:17<br>3rd | | | |
| Record times in previous 3 races | 2 · 9 · 48 ·<br>2 · 19 · 23 ·<br>2 · 12 · 28 · | | | |
| Experience of marathon | 5 times | | | |
| Best time | 2 · 9 · 48 | | | |
| Evaluation | ○ ◎ ○ | | | |
| Comment | · · · | | | |
| | | | | |

METHOD FOR FORECASTING RANKING OF RACING CONTESTS

BACKGROUND OF THE INVENTION

1. Field of the Invention

The present invention relates to a method of forecasting places of racing contests, in which places are determined according to speed of contestants, before starting of the racing contest.

2. Discussion of the Related Art

In various types of racing contests, it is quite interesting to not only horse racing fans but also others to forecast places of a racing contest based on various data acquired before the race. Besides, it is desirable to acquire information with which forecast probability can increase.

These types of information are conventionally acquired from media such as television and radio broadcasting, newspaper and the Internet. However, such information can be reached one day or a half before the race.

It is obvious that information provided as real-time data gives very much importance such as weather, wind direction and wind speed at the time just before the race, and, for example in the case of a horse racing contest, so-called paddock information such as training results, complexion of horse contestants in forecasting the places of the contestants. That information, however, can be acquired only when a person goes to the real racing venue, and further the information is very hard to easily acquire even when the person goes to the venue.

SUMMARY OF THE INVENTION

It is an object of the present invention to provide a person even at home with racing contestants in the form of computer graphics, into which past information is incorporated, to provide information referred to as real- time data, and to dramatically improve capability of forecasting the places of the contestants.

That is, one characteristic of the present invention is to draw racing contestants by means of computer graphics, to incorporate existing past data in connection with said racing contestants, to perform a race on a display, and thereby to make it possible to forecast the places based on the racing conditions and results.

The present invention is also characterized in that real-time information is additionally incorporated into the existing past data.

Typical racing contests include horse races, bicycle races, speedboat races, motorcycle races, marathons, and the like. The present invention further enables to provide not only common information such as weather, wind direction, wind speed and physical conditions just before the starting of the race, but also information, which cannot be acquired until just before the starting, such as training results of horse contestants for horse races, engine condition for speedboat races and motorcycle races, audience cheers, and the like.

The present invention is further characterized in that, each of the information is provided with a corresponding weight. Namely, in performing forecast, wind direction and wind speed at the time just before the start of the race are important actors and, therefore, should be given greater weights, while audience cheers or the like are not considered to be important factors except for certain cases. Therefore, it is also one characteristic of the present invention to conduct calculation in corporation with weights and to thereby allow the calculation to result in forecast of places with high hitting probability.

BRIEF DESCRIPTION OF THE DRAWINGS

FIG. 7 is a view showing past data on bicycle races.

FIG. 9 is a view showing past data on speedboat races.

FIG. 11 is a view showing past data on marathon races.

DESCRIPTION OF THE PREFERRED EMBODIMENT

[Embodiment 1]

To describe the method of the present invention, an entire system will be firstly described in detail with reference to FIG. 1.

Figure 1:
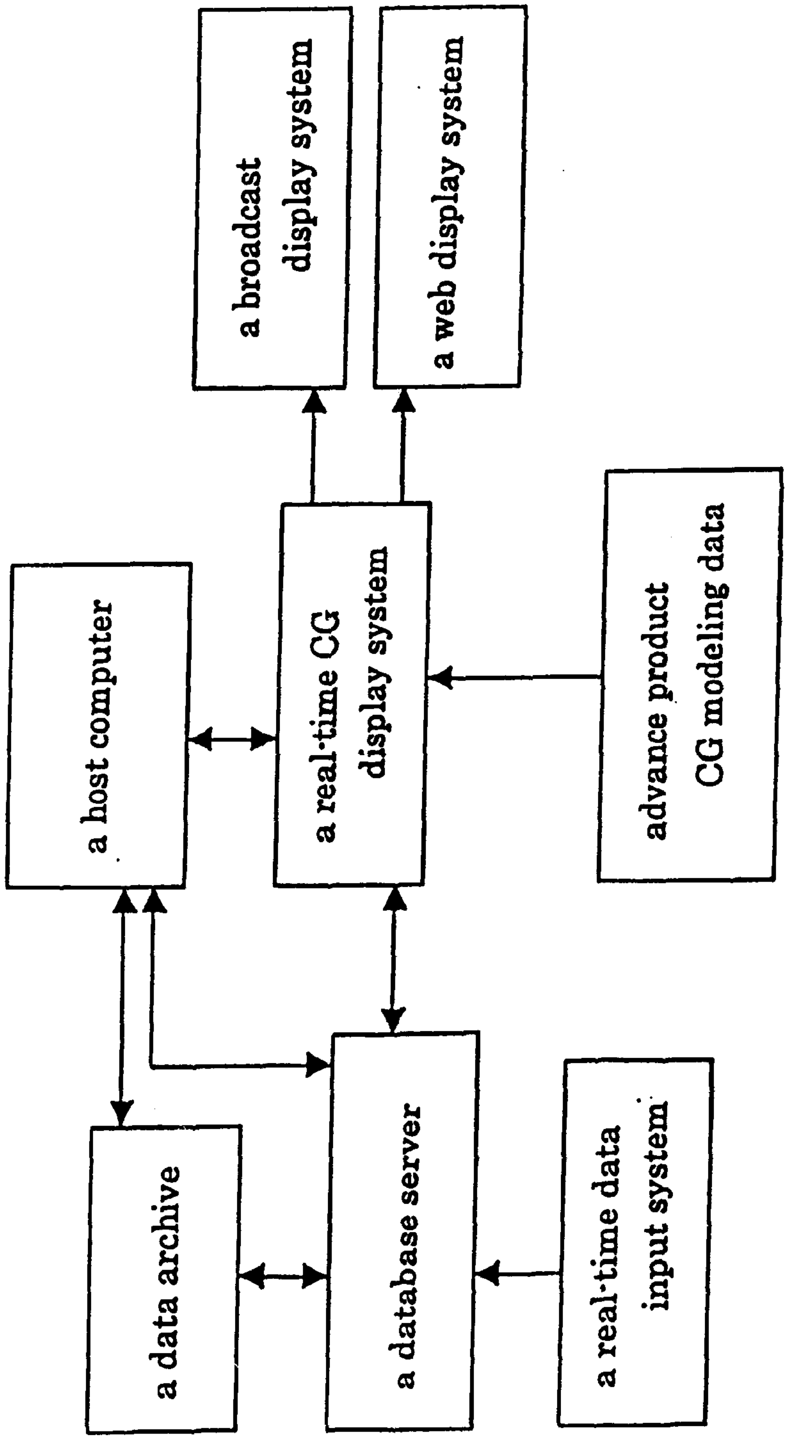
FIG. 1 is a block diagram of an entire system according to the present invention.
Figure 4:
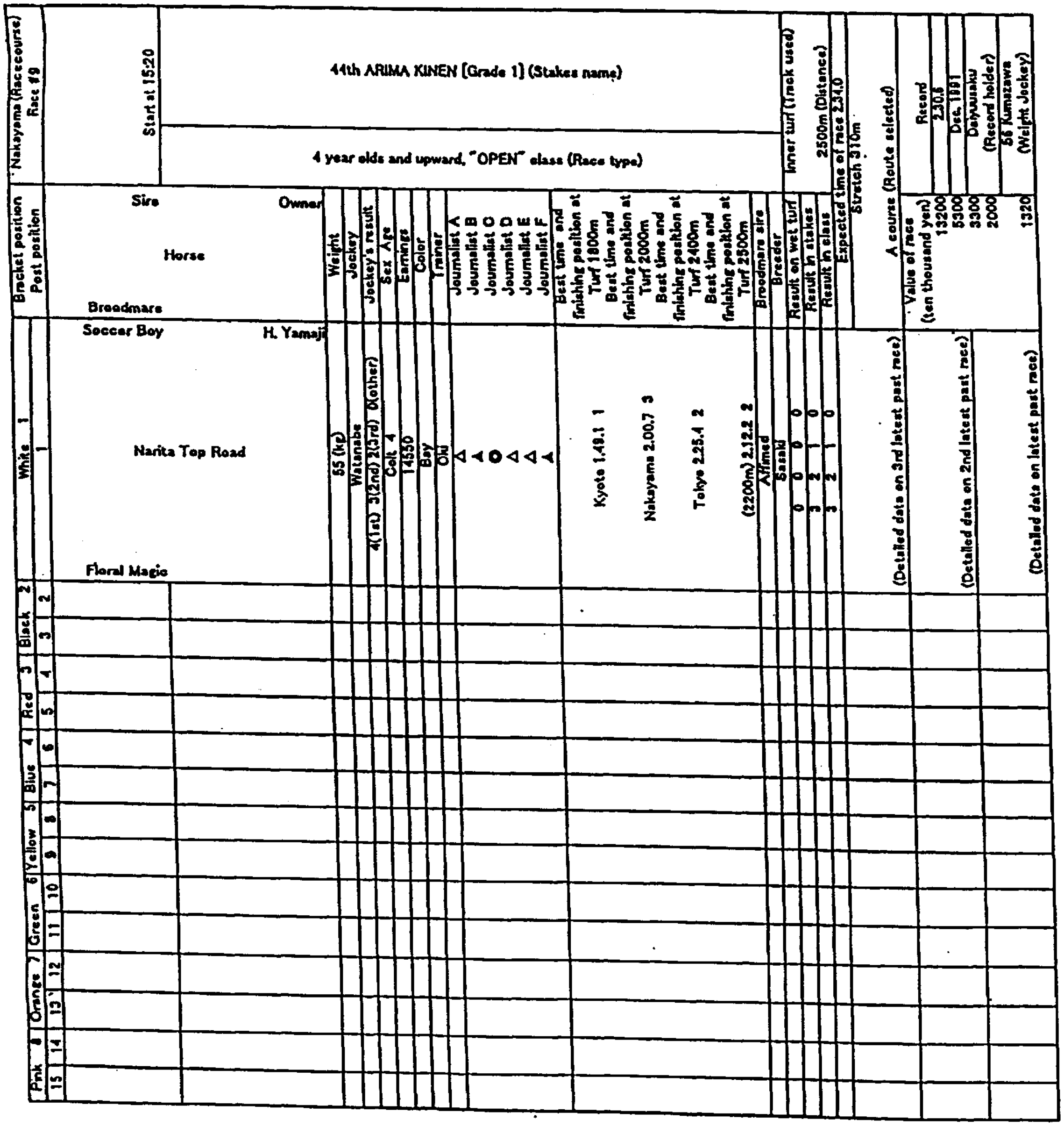
FIG. 4A is a table showing past data on horse races in Japanese and FIG. 4B shows the English translation of the columns 1–2 and row 1 of the table.
Figure 8:
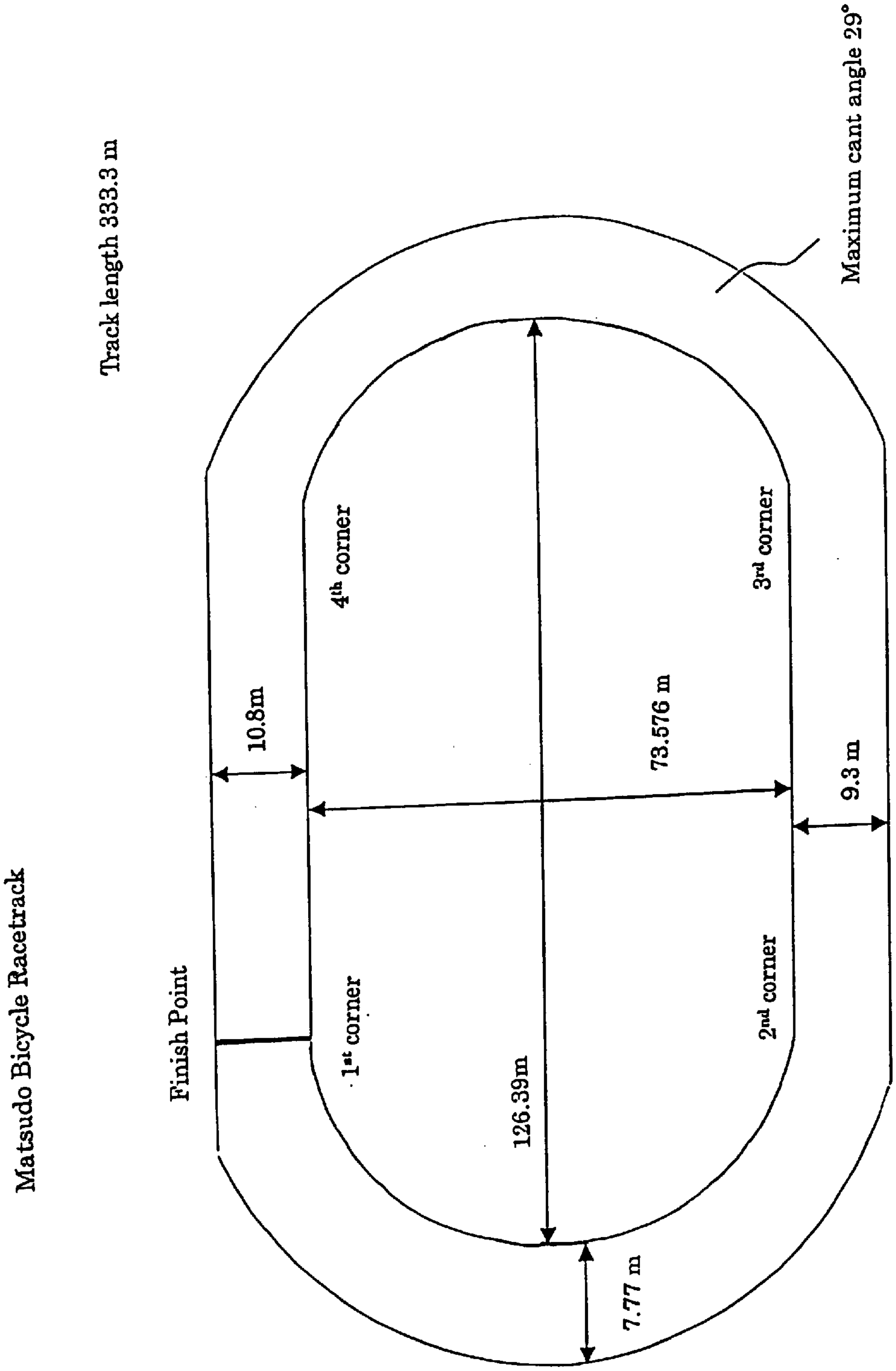
FIG. 8A is a view showing a racetrack of the bicycle races and FIG. 8B shows the relevant English translation of the view.
Figure 10:
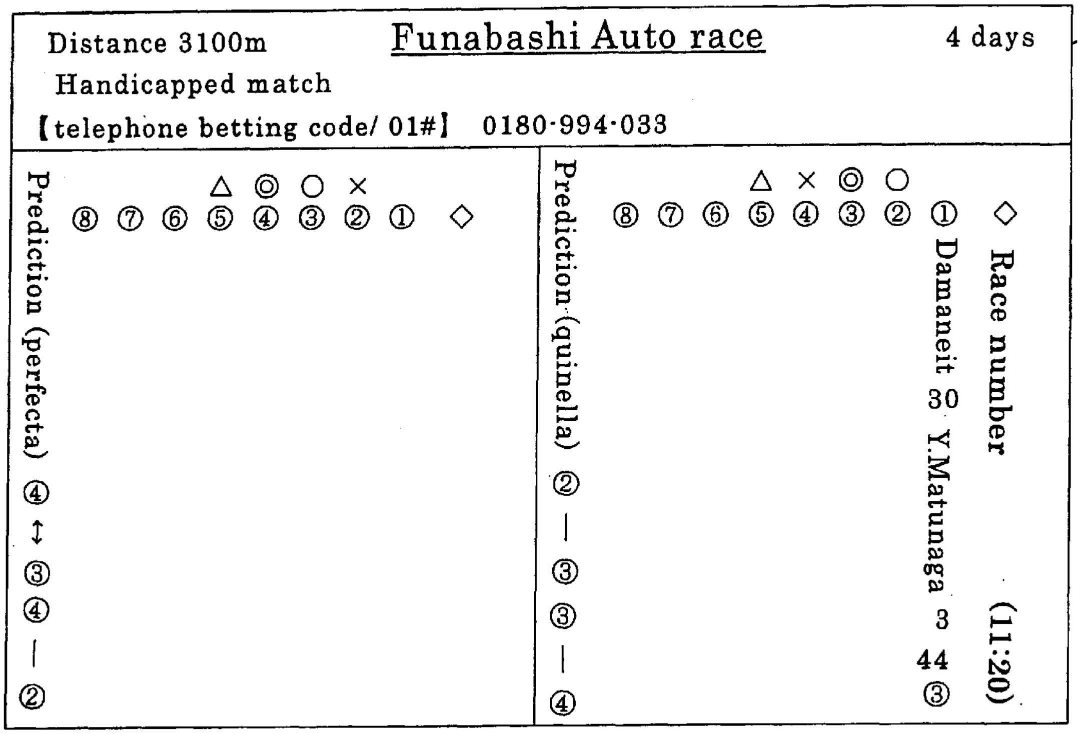
FIG. 10 is a view showing past data on motorcycle races.

In FIG. 1, numeral (1) denotes a data archive input system capable of inputting at least several times of existing past data, which is shown in FIG. 4 in the case of a horse race, which is shown in FIGS. 7 and 8 in the case of a bicycle race, which is shown in FIG. 9 in the case of a speedboat race, which is shown in FIG. 10 in the case of a motorcycle race, or which is shown in FIG. 11 in the case of a marathon race.

Numeral (2) denotes a real-time data input system. Although the detail of this system (2) is not shown herein, the real-time data is information that is available at a paddock in the case of a horse race. It is structured so as to input, using mobile computer terminals, at least more than twenty items of information such as paddock information on training (so-called training results), fast workout results, trainers, owners and complexion of horses, and weather, wind direction, wind speed and the like at the time just before the starting.

The inputted data is transferred to a database server (3) at a base station through mobile telephones or the Integrated Service Digital Network (ISDN) line. It is noted that the past data already inputted into the data archive (1) is also transferred to the database server (3).

Namely, the database server (3) detects the data on the contestants from the data archive (1) and, at the same time, combines the data with information from the real-time data input system (2) in response to a command from the place where data on the race held on the same date is stored (which is, in many cases, host computer (4)).

The host computer (4) gives preset "weights" to the information, respectively. Specifically, the most important factors in forecasting places of a racing contest are, for example, wind direction, wind speed and weather at the time just before the starting, and are provided with great weights.

Conversely, audience cheers are provided with a small weight numerically. The real-time data thus weighted are combined with the past data and forecast calculation is performed.

Meanwhile, numeral (5) denotes a real-time computer graphic system. In the case of horse races, the system (5) creates images of horses by modeling data (6) that is produced in advance.

At that moment, it is significant to display numerals such as post position numbers and colors of jockeys' clothes and caps the same as actual ones, and it is more interesting if a relatively large horse is displayed as it is.

Numeral (7) denotes a broadcast display system and numeral (8) denotes a web display system, and they can provide subscribers with images and voices in a real-time manner.

[Embodiment 2]

Next, an embodiment of a method for forecasting places of a horse race will be described. Information available from horse race newspapers or the like published approximately a day before a race includes post position order, jockeys, past results, earnings and the like, as shown in FIG. 4 Since such data are stored in the data archive (1) , they are retrieved by the database server (3) in response to a command of the host computer (4). At the same time, the training results of contestant horses, fast workout results and other paddock information as well as trainer information and owner information that are uniquely acquired by, for example, informers at the paddock are inputted into the real-time input system (2) and are transferred to the database server (3) through mobile telephones or the ISDN line.

Figure 5:
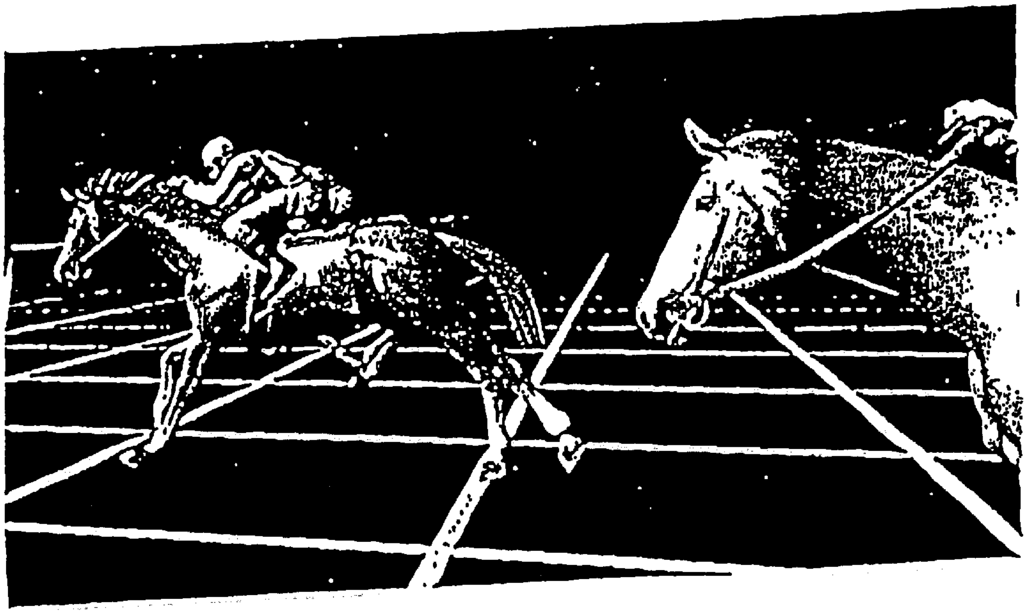
FIG. 5 is a graphical view showing horses during a race.

Then, the computer graphic display system (5) prepares all contestant horses by using the modeling data (6) created in advance (see FIG. 5). In this case, it is important to give the contestant horses and jockeys the same post position numbers and colors as those of actual horses and jockeys.

A person (viewer) who wishes to use this ranking forecast system makes a contract or the like in advance with an information provider. When the viewer activates the forecast system, the broadcast display system (7) or the web display system (8) is accessed by the viewer.

Thereafter, when the viewer clicks on a desired race (not shown) at the time just before the starting (in many cases, just before the end of betting ticket sales), the forecast system performs the race, which is substantially the same as the actual race, in the form of computer graphics, since information on types of the respective contestant horses, such as leading type, last-spurt type, or the like, if any, are also inputted. The viewer may forecast real places based on the results of the race by watching the race from start to finish by means of dynamic images. However, the viewer may add viewer's own judgement to the data by adding still images as shown in FIG. 3.

Figure 2:
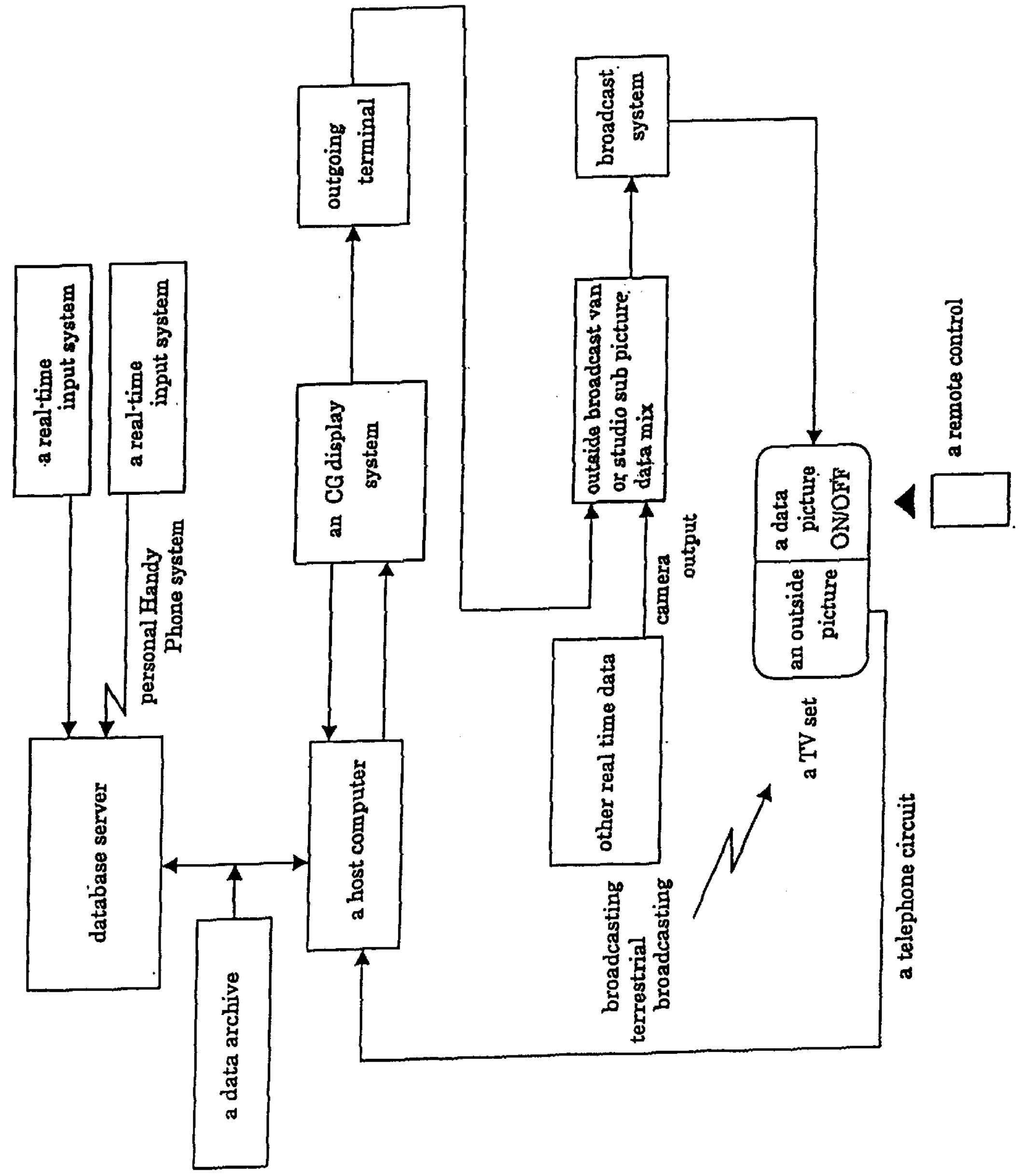
FIG. 2 is a block diagram showing the entire system according to the present invention to which two image screens are added.
Figure 3:
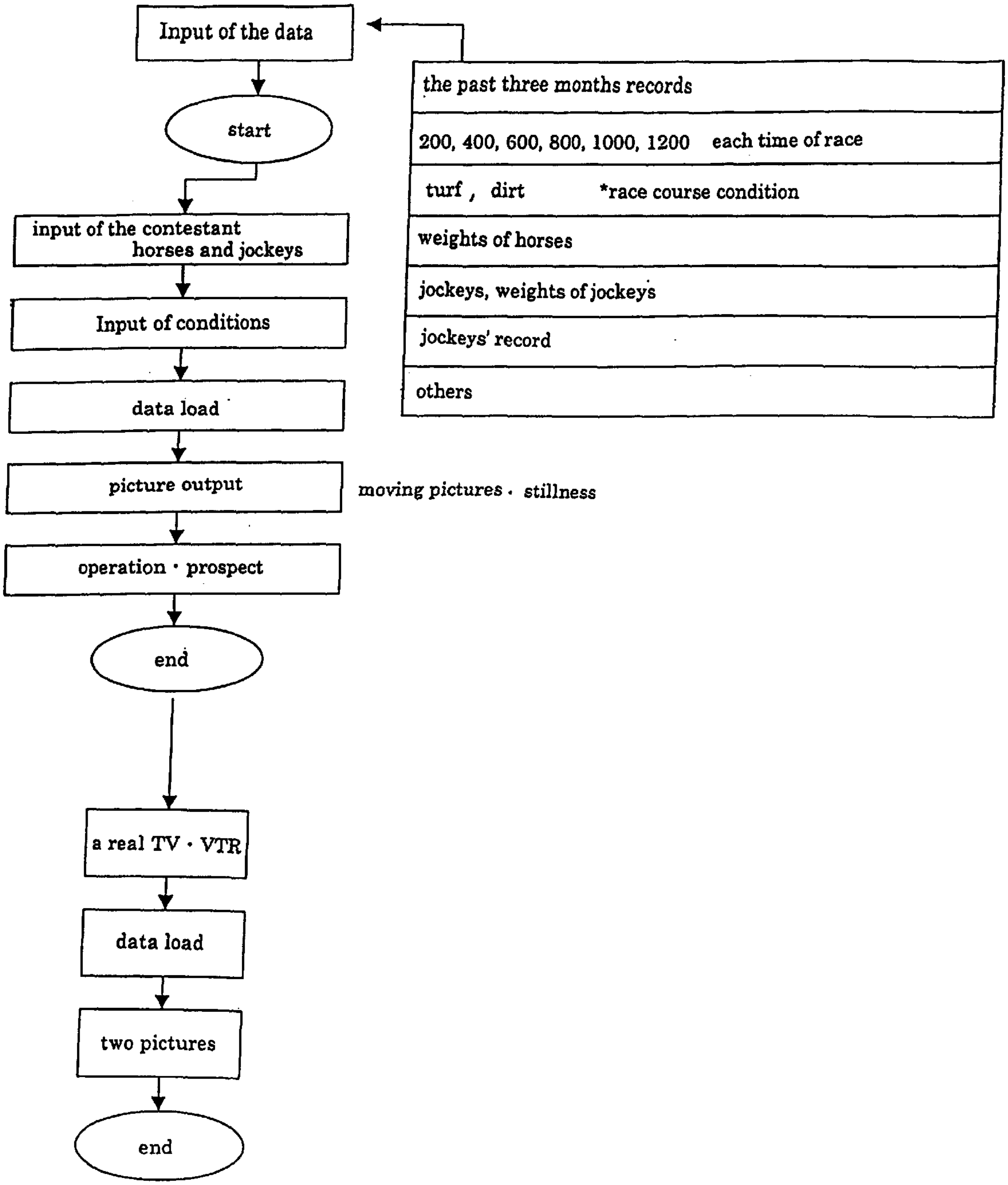
FIG. 3 is a flow chart showing the flow of operation of the present invention.
Figure 6:
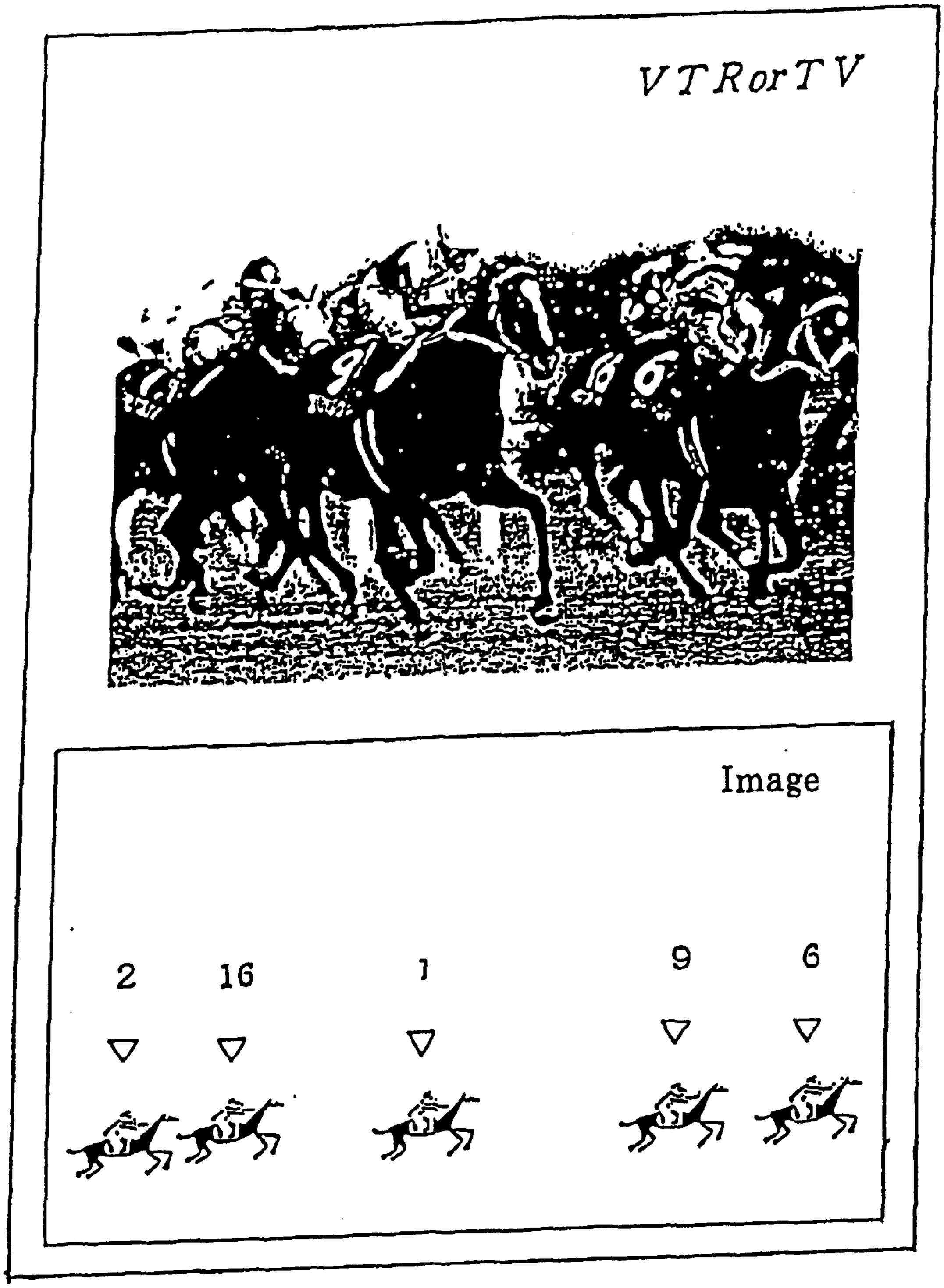
FIG. 6 shows two image screens, one for a horse race during an actual race and another for a horse race in graphics.

As shown in FIGS. 2, 3 and 6, in checking the results of the forecast, it will be very interesting to the viewer to display the graphic horses and the horses of the real race at the same time without overlapping with one another while broadcasting the real race.

This system will be described with reference to FIG. 2 while the same parts in FIG. 2 as those in FIG. 1 are denoted by the same reference numerals. The images of the real race are retrieved into a receiving apparatus i.e. a television (9) via satellite broadcasting or terrestrial broadcasting while the information from the real-time data (2) is mixed with the graphic images produced as above-mentioned by a mixing system (10) , and the mixed graphic images are displayed so as not to overlap the images of the real race on the television (9) by, for example, the broadcast system (11).

[Embodiment 3]

With regard to a bicycle race shown in FIGS. 7 and 8, the system is substantially the same as that of horse races. In this case, it is essential to obtain information on classes and groups as past data. Bicycle riders belonging to the same class or the same group tend to have strong sense of rivalry against one another and therefore such data are provided with relatively heavy weights. Further, of real-time information, wind direction and wind speed are particularly required for forecasting since they may be subject to structures of cycling tracks and stadiums.

For example, at Matsudo Cycling Stadium in Matsudo-shi, Chiba, Japan, the stand are structured to surround the racetrack, and when a light puff of wind blows the wind sometimes does not go through the stadium but circulates in the stadium. That may result in head winds blow throughout a race against all the contestants of the race. For that reason, if even a light wind blows at the time just before the starting of the race, contestants who are strong in head winds have a clear advantage over the others.

Such information can be obtained only as real-time information, with which it is possible to forecast a race with higher hitting probability.

[Embodiment 4]

In the case of a speedboat race shown in FIG. 9, the most important information of the past information is start capability of contestants, namely whether or not a speedboat rider can always make a good start. As for real-time information, visual information on, for example, physical conditions, countenances and the like of each of the riders.

[Embodiment 5]

In the case of a motorcycle race shown in FIG. 10, it is said that engine sounds on the day of a race is particularly important, and expert knowledge is required for judgement. Also, information on motorcycle riders' vigor is particularly given an important weight.

[Embodiment 6]

Figure 12:
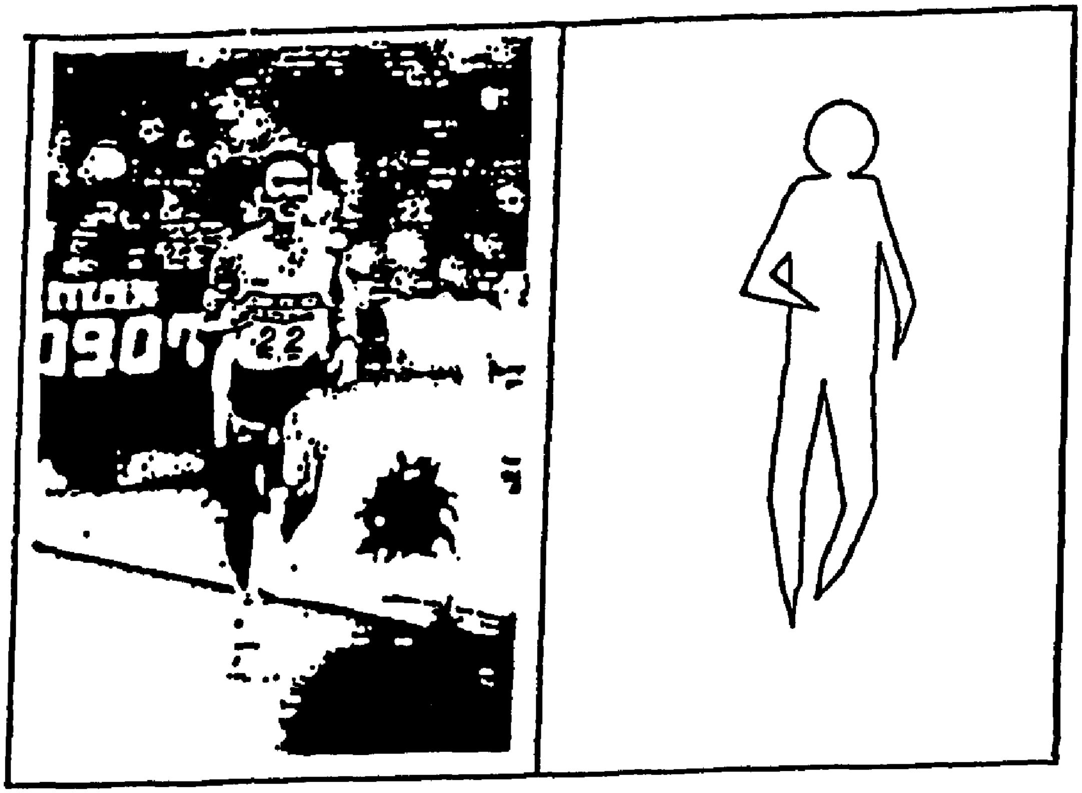
FIG. 12 show two image screens, one for a running state in an actual marathon and another for a marathon in graphics.

In the case of a marathon race shown in FIGS. 11 and 12 , real-time information at the time just before the starting of a race is particularly given greater weight than past data in forecasting the race, and usually such information may be acquired visually. Runners' ability and vigor, that is, fall physical strength and vigor just before the starting of the race are important. Besides, it is designed so as to give a greater weight to air temperature just before the race as real-time information.

As above-described in detail, according to the present invention, it becomes possible to perform forecasting places of various types of racing contests with interest by graphically creating future real data based on data provided before the starting of a contest, and to increase hitting probability in forecasting the places by adding, in particular, real-time information just before the race.

What is claimed is:

1. A method for forecasting placings in a live racing contest, comprising the steps of:

providing at least one display and a simulator;

simulating with the simulator images of the live racing contest having live contestants in a racing venue with a start point and a finish point by means of computer graphics;

inputting to the simulator past contest data and live contest data of the contestants and the venue before the contest starts so as to generate said images and forecast the placings of the contest;

displaying said images on the display; and forecasting with the simulator in advance the placings of the contestants in the live racing contest, wherein said past contest data includes actual contest conditions and records of the contestants and the venue, and said live contest data includes actual contest conditions of the contestants and the venue.

2. A method for forecasting placings in a live racing contest according to claim 1, wherein the contestants include both the horses and the riders, and said past contest data relates to horse racing contests and is one of or a combination of a plurality of information selected from a group consisting of lap times, results, earnings, weights, training results, fast workout results, trainers, post position numbers, track conditions and weather, which are respectively weighted by the simulator.

3. A method for forecasting placings in a live racing contest according to claim 1, wherein said past contest data relates to bicycle racing contests and is one of or a combination of a plurality of information selected from a group consisting of race scores, results, earnings, post position numbers, weights of bicycle riders, ages, training results, fast workout results, classes, groups and winning tricks, which are respectively weighted by the simulator.

4. A method for forecasting placings in a live racing contest according to claim 1, wherein said past contest data relates to speedboat racing contests and is one of or a combination of a plurality of information selected from a group consisting of post position numbers, registered hometowns, weights of speedboat riders, acceleration capability, speed, turn capability, winning averages, and displayed times, which are respectively weighted by the simulator.

5. A method for forecasting placings in a live racing contest according to claim 1, wherein said past contest data relates to motorcycle racing contests and is one of or a combination of a plurality of information selected from a group consisting of post position numbers, ages, heights, affiliations, 100-meter speed and speed power, which are respectively weighted by the simulator.

6. A method for forecasting placings in a live racing contest according to claim 1, wherein said past contest data relates to marathon racing contests and is one of or a combination of a plurality of information selected from a group consisting of affiliations, weights, heights, experiences, results, number of times of participation in full-course marathons and number of times of race withdrawals, best times, which are respectively weighted by the simulator.

7. A method for forecasting placings in a live racing contest according to claim 1, further comprising a step of taking real-time contest data immediately prior to the contest starts and imputing the real-time contest data to the simulator.

8. A method for forecasting placings in a live racing contest according to claim 7, wherein the real-time contest data is one of or a combination of a plurality of information selected from a group consisting of wind direction, wind speed, weather, training results, physical condition of horses and riders as so-called paddock information, which are respectively weighted by the simulator.

9. A method for forecasting placings in a live racing contest according to claim 7, wherein the real-time contest data is one of or a combination of a plurality of information selected from a group consisting of wind direction, wind speed, weather of the venue, physical conditions of the contestants and the bicycles ridden by the contestants, which are respectively weighted by the simulator.

10. A method for forecasting placings in a live racing contest according to claim 7, wherein the real-time contest data is one of or a combination of a plurality of information selected from a group consisting of wind direction, wind speed, weather, presence of waves of the venue, physical conditions of the contestants, engine conditions, engine sounds of the speedboats sailed by the contestants, which are respectively weighted by the simulator.

11. A method for forecasting placings in a live racing contest according to claim 7, wherein the real-time contest data is one of or a combination of a plurality of information selected from a group consisting of wind direction, wind speed, weather, track condition of the venue, physical conditions of the contestants, engine conditions, engine sounds of the motorcycles ridden by the contestant, which are respectively weighted by the simulator.

12. A method for forecasting placings in a live racing contest according to claim 7, wherein the real-time contest data is one of or a combination of a plurality of information selected from a group consisting of wind direction, wind speed, weather track condition of the venue, physical conditions of the contestants of a marathon contest, audience cheers, which are respectively weighted by the simulator.

* * * * *